United States Patent
Zhou (10) Patent No.: US 10,543,739 B1
(45) Date of Patent: Jan. 28, 2020

(54) MODE TRANSITION CONTROL TECHNIQUES FOR AN ELECTRICALLY ALL-WHEEL DRIVE HYBRID VEHICLE

(71) Applicant: Yuxing Zhou, Sterling Heights, MI (US)

(72) Inventor: Yuxing Zhou, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/045,089

(22) Filed: Jul. 25, 2018

(51) Int. Cl.
*B60K 6/52* (2007.10)
*B60W 10/08* (2006.01)
*B60W 20/00* (2016.01)

(52) U.S. Cl.
CPC .............. *B60K 6/52* (2013.01); *B60W 10/08* (2013.01); *B60W 20/00* (2013.01)

(58) Field of Classification Search
CPC ...... B60W 10/08; B60W 10/06; B60W 20/00; B60W 2710/0644; B60W 2510/0657; B60W 2050/0096; B60K 6/48; B60K 6/52; B60K 6/20; B60K 2007/0092; B60K 28/10
See application file for complete search history.

(56) References Cited

U.S. PATENT DOCUMENTS

| | | | |
|---|---|---|---|
| 5,818,116 A | 10/1998 | Nakae et al. | |
| 6,827,167 B2 | 12/2004 | Cikanek et al. | |
| 7,370,715 B2 | 5/2008 | Colvin et al. | |
| 8,204,659 B2 | 6/2012 | Kouno et al. | |
| 8,219,303 B2 | 7/2012 | Schwenke et al. | |
| 8,480,536 B2 | 7/2013 | Weiss et al. | |
| 8,827,866 B2 | 9/2014 | Nakanishi et al. | |
| 9,827,842 B2 | 11/2017 | Blasinski et al. | |
| 2012/0010041 A1 | 1/2012 | Soliman et al. | |
| 2013/0191012 A1 | 7/2013 | Hirotsu et al. | |
| 2014/0243149 A1* | 8/2014 | Holmes ................ | B60W 20/30 477/5 |
| 2015/0088356 A1 | 3/2015 | Sailer et al. | |
| 2015/0134160 A1* | 5/2015 | Liang .................... | B60W 10/06 701/22 |
| 2015/0217759 A1 | 8/2015 | Wimmer et al. | |
| 2015/0246668 A1 | 9/2015 | Voelkel et al. | |
| 2015/0353075 A1* | 12/2015 | Futatsudera ........... | B60K 6/442 701/22 |

(Continued)

*Primary Examiner* — Thai T Dinh
(74) *Attorney, Agent, or Firm* — Ralph E. Smith (57) ABSTRACT

Control techniques for an electrically all-wheel drive (eAWD) hybrid vehicle involve determining whether to transition from an electric-only mode to a parallel mode based on a driver torque request or a state of charge (SOC) of a battery system. During the electric-only mode, the electric motor is operated such that a torque reserve is maintained. When the driver torque request exceeds a maximum drive torque that the electric motor is capable of generating, the electric-only to parallel mode transition is performed. This involves the electric motor depleting the torque reserve to provide an expected acceleration feel for the driver while engine and transmission speeds are synchronized. When the SOC of the battery system falls below an SOC threshold, the drive torque of the electric motor is decreased to zero upon engine/transmission speed synchronization such that the battery system can be recharged.

16 Claims, 6 Drawing Sheets

(56) References Cited

U.S. PATENT DOCUMENTS

| | | |
|---|---|---|
| 2016/0009269 A1 | 1/2016 | Zhou et al. |
| 2016/0221570 A1* | 8/2016 | Chen .................... B60W 30/182 |
| 2017/0001624 A1* | 1/2017 | Wang .................... B60W 10/06 |

* cited by examiner

MODE TRANSITION CONTROL TECHNIQUES FOR AN ELECTRICALLY ALL-WHEEL DRIVE HYBRID VEHICLE

FIELD

The present application generally relates to hybrid vehicles and, more particularly, to techniques controlling mode transitions for an electrically all-wheel drive (eAWD) hybrid vehicle.

BACKGROUND

Vehicles include a torque generating unit (e.g., an internal combustion engine) that generates drive torque. This drive torque is typically transferred to a first axle of the vehicle via a transmission (e.g., an automatic transmission). The first axle is rotatably coupled to wheels/tires of the vehicle, which transfer the drive torque from the first axle to a road surface. In an electrically all-wheel drive (eAWD) hybrid vehicle, the vehicle further includes an electric motor coupled to a second axle. In an electric-only mode, the engine is off, the transmission is disengaged, and the electric motor propels the vehicle via drive torque at the second axle. In a parallel mode, the engine is on, the transmission is engaged, and both the engine and the electric motor propel the vehicle via drive torque at their respective axles. During mode transitions, torque disturbances and/or delays could occur at the axles, which could be noticeable to a driver of the vehicle. Accordingly, while such vehicle drive systems work well for their intended purpose, there remains a need for improvement in the relevant art.

SUMMARY

According to one example aspect of the invention, a control system for an electrically all-wheel drive (eAWD) hybrid vehicle is presented. In one exemplary implementation, the system comprises: an input device configured to receive a driver torque request, and a controller configured to: operate the hybrid vehicle in an electric-only mode including maintaining a torque reserve for an electric motor of the vehicle, wherein during the electric-only mode only the electric motor is providing drive torque to a first axle of the hybrid vehicle, receive, from the input device, the driver torque request, determine to transition the hybrid vehicle from the electric-only mode to a parallel mode based on the driver torque request or a state of charge (SOC) of a battery system that powers the electric motor, wherein during the parallel mode the electric motor is providing drive torque to the first axle and an engine of the vehicle is providing drive torque to a different second axle of the hybrid vehicle via a transmission, and when the driver torque request exceeds a maximum drive torque that the electric motor is capable of generating, increase the drive torque provided by the electric motor to the first axle by depleting the torque reserve while simultaneously synchronizing speeds of the engine and transmission during the electric-only to parallel mode transition.

In some implementations, the controller is configured to increase the drive torque provided by the electric motor by depleting the torque reserve to provide an expected acceleration feel for a driver of the vehicle. In some implementations, upon the engine and transmission speeds being synchronized, the controller is further configured to complete the electric-only to parallel mode transition by: decreasing the drive torque provided by the electric motor to the first axle, and increasing the drive torque provided by the engine to the second axle via the transmission, wherein the drive torque provided by the electric motor and the engine via the transmission collectively meet the driver torque request. In some implementations, the controller is configured to decrease the drive torque provided by the electric motor to the first axle to an optimal level for system efficiency.

In some implementations, the system further comprises an SOC sensor configured to measure the SOC of the battery system, and the controller is configured to perform the electric-only to parallel mode transition when the measured SOC of the battery system falls below an SOC threshold indicative of a need to recharge the battery system. In some implementations, upon the engine and transmission speeds being synchronized, the controller is further configured to complete the electric-only to parallel mode transition by: decreasing the drive torque provided by the electric motor to the first axle to zero such that the battery system can be recharged, and increasing the drive torque provided by the engine to the second axle via the transmission to meet the driver torque request. In some implementations, the engine further comprises a belt-driven starter generator (BSG) unit configured to start the engine. In some implementations, the first axle is a rear axle of the vehicle and the second axle is a front axle of the vehicle.

According to another example aspect of the invention, a method of performing a mode transition of an eAWD hybrid vehicle is presented. In one exemplary implementation, the method comprises: operating, by a controller, the hybrid vehicle in an electric-only mode including maintaining a torque reserve for an electric motor of the vehicle, wherein during the electric-only mode only the electric motor is providing drive torque to a first axle of the hybrid vehicle, receiving, by the controller and from an input device, a driver torque request, determining, by the controller, to transition the hybrid vehicle from the electric-only mode to a parallel mode based on the driver torque request or an SOC of a battery system that powers the electric motor, wherein during the parallel mode the electric motor is providing drive torque to the first axle and an engine of the vehicle is providing drive torque to a different second axle of the hybrid vehicle via a transmission, and when the driver torque request exceeds a maximum drive torque that the electric motor is capable of generating, increasing, by the controller, the drive torque provided by the electric motor to the first axle by depleting the torque reserve while simultaneously synchronizing speeds of the engine and transmission during the electric-only to parallel mode transition.

In some implementations, increasing the drive torque provided by the electric motor comprises depleting the torque reserve to provide an expected acceleration feel for a driver of the vehicle. In some implementations, the method further comprises upon the engine and transmission speeds being synchronized, completing, by the controller, the electric-only to parallel mode transition by: decreasing, by the controller, the drive torque provided by the electric motor to the first axle, and increasing, by the controller, the drive torque provided by the engine to the second axle via the transmission, wherein the drive torque provided by the electric motor and the engine via the transmission collectively meet the driver torque request. In some implementations, decreasing the drive torque provided by the electric motor to the first axle comprises decreasing, by the controller, the drive torque provided by the electric motor to the first axle to an optimal level for system efficiency.

In some implementations, the method further comprises: receiving, by the controller and from an SOC sensor, a measured SOC of the battery system, wherein the electric-only to parallel mode transition is performed when the measured SOC of the battery system falls below an SOC threshold indicative of a need to recharge the battery system. In some implementations, the method further comprises upon the engine and transmission speeds being synchronized, completing, by the controller, the electric-only to parallel mode transition by: decreasing, by the controller, the drive torque provided by the electric motor to the first axle to zero such that the battery system can be recharged, and increasing, by the controller, the drive torque provided by the engine to the second axle via the transmission to meet the driver torque request. In some implementations, the engine further comprises a BSG unit configured to start the engine. In some implementations, the first axle is a rear axle of the vehicle and the second axle is a front axle of the vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, mode transitions in an electrically all-wheel drive (eAWD) hybrid vehicle could cause torque disturbances and/or delays at an axle of the vehicle, which could be noticeable to a driver of the vehicle. This is particularly true for electric-only to parallel mode transitions, during which synchronization of the engine/transmission speeds needs to be performed to prevent a torque disturbance. Accordingly, while operating in an electric-only mode, a torque reserve for the electric motor is always maintained. When the driver torque request exceeds a maximum amount of drive torque that the electric motor is capable of generating, the engine is started and synchronization between speeds of the engine and the transmission occurs. During this period, the torque reserve is depleted and the electric motor provides additional drive torque, thereby providing the expected acceleration feel. Additionally, when a state of charge (SOC) of a battery system powering the electric motor falls below threshold, the engine is started, speed synchronization occurs, and the electric motor drive torque is then ramped down to zero so the battery system can be recharged.

Figure 1:
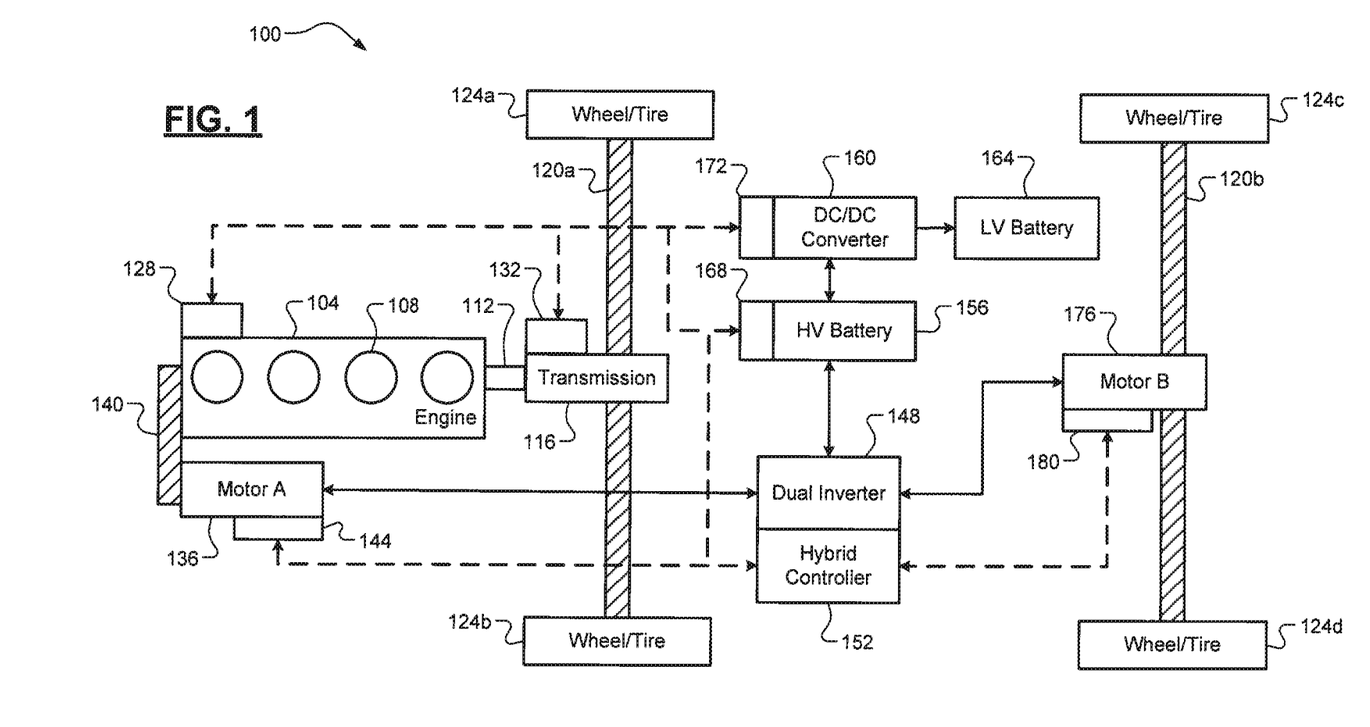
FIG. 1 illustrates a first example electrically all-wheel (eAWD) drive hybrid vehicle according to the principles of the present disclosure.

Referring now to FIG. 1, one exemplary configuration of an eAWD hybrid vehicle 100 is illustrated. It will be appreciated that this is merely one example vehicle configuration (see, e.g., FIG. 2 for a more generic configuration). The vehicle 100 includes an internal combustion engine 104 that is configured to combust a mixture of air and fuel within cylinders 108 to drive pistons (not shown) that generate drive torque at a crankshaft 112. While only four cylinders are shown, it will be appreciated that the engine 104 could include any suitable number of cylinders. The drive torque at the crankshaft 112 is transferred by a transmission 116 to a front axle 120a of the vehicle 100. The front axle 120a is in turn connected to front wheels/tires 124a, 124b. The engine 104 is controlled by a respective control unit/module 128, and the transmission 116 is controlled by a respective control unit/module 132.

The engine 104 also includes a belt-driven starter generator (BSG) unit including an electric motor 136 ("Motor A") and a drive device 140 (e.g., a belt or chain) that couples the electric motor 136 to the crankshaft 112. The electric motor 136 is capable of acting both as a torque provider by providing torque to the crankshaft 112 (e.g., to start the engine 104) and a torque consumer by converting a portion of the drive torque at the crankshaft 112 into electrical energy. The BSG unit is capable of quickly starting the engine 104, such as in response to an electric-only to parallel mode transition being initiated. The electric motor 136 is controlled by a respective control unit/module 144. The electric motor 136 either receives electrical energy from or provides electrical energy to a dual inverter 148. The duel inverter 148 is controlled by a respective hybrid controller 152.

This hybrid controller 152 also communicates with the other control modules/units such that the vehicle 100 generates a desired drive torque, e.g., based on a driver torque request. The dual inverter 148 is also connected to a high voltage (HV) battery 156. The dual inverter 148 converts alternating current (AC) (to/from the electric motor 136) into direct current (DC) (to/from the HV battery 156 and vice-versa. The HV battery 156 is connected to a DC-DC converter 160, which steps-down a voltage of the HV battery 156 to recharge a low voltage (LV) battery (e.g., a 12 volt lead-acid battery). The HV battery is controlled by a respective control unit/module 168 and the DC-DC converter 160 is controlled by a respective control unit/module 172, both of which are also in communication with the hybrid controller 152.

The vehicle 100 further includes another electric motor 176 ("Motor B"). This electric motor 176 is also referred to as a traction motor because it provides drive torque to a rear axle 120b, which is in turn connected to rear wheels/tires 124c, 124d. It will be appreciated that the term "axle" as used herein includes a solid axle, half shafts, or any other suitable axle configuration. It will also be appreciated that the front and rear axles 120a, 120b could have the same axle configuration or different axle configurations. The electric motor 176 receives electrical energy (AC) from the dual inverter 148 in order to generate this drive torque. The electric motor 176 is controlled by a respective control module/unit 180, which is also in communication with the hybrid controller 152. During clutch-to-clutch gear shifts of the transmission 116, the drive torque at the front axle 120a temporarily drops or is delayed from reaching a desired drive torque. The techniques of this disclosure control the electric motor 176 to compensate for this torque disturbance during transmission gear shifts.

Figure 2:
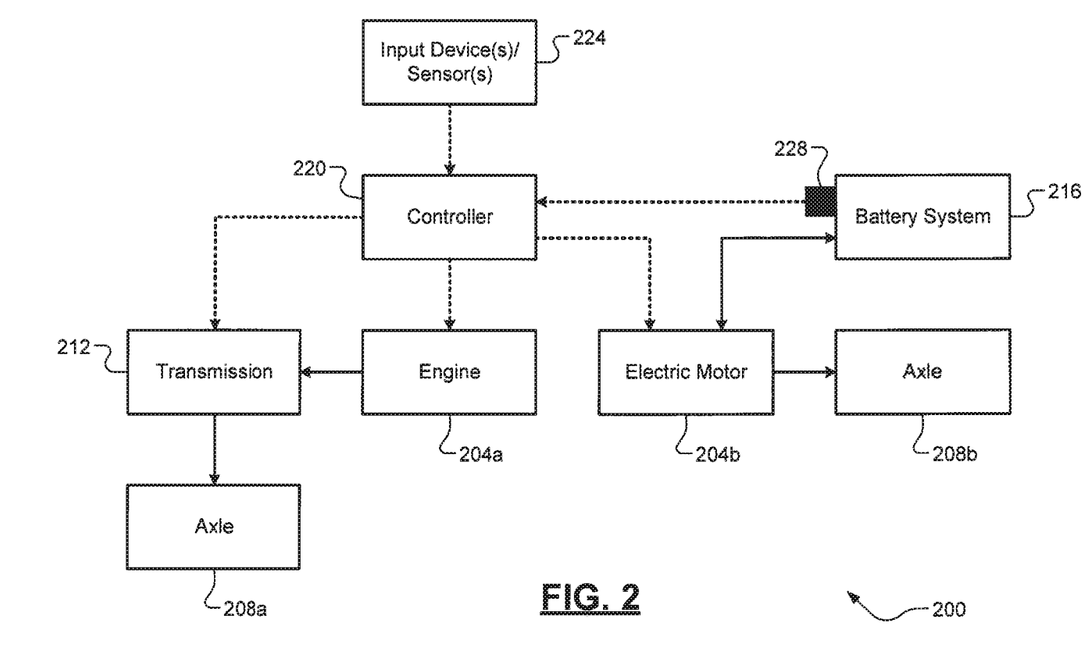
FIG. 2 illustrates a second example eAWD hybrid vehicle according to the principles of the present disclosure.

Referring now to FIG. 2, another more generic exemplary configuration of an BAWD hybrid vehicle 200 is illustrated. The vehicle 200 includes an engine 204*a* that is configured to combust an air/fuel mixture to generate drive torque. The drive torque generated by the engine unit 204*a* is transferred to a first axle 208*a* of the vehicle 200 via a transmission 212. The first axle 208*a* could be either a front or a rear axle of the vehicle 200. Non-limiting examples of the transmission 212 include a multi-ratio transmission, such as an electrically-variable transmission (EVT), an automatic transmission (AT), and a dual clutch transmission (DCT). The transmission 212 includes a system of clutches (not shown) and one or more planetary gear sets (not shown) that are collectively operable to achieve a desired gear ratio. Torque at an input shaft (not shown) of the transmission 212 is multiplied by this gear ratio to achieve a final output torque at an output shaft (not shown) of the transmission 212, which is provided to the first axle 208*a*. The transmission 212 may further comprise a torque converter (not shown) (e.g., a fluid coupling) for selectively coupling a crankshaft of the engine 204*a* to the input/turbine shaft of the transmission 212.

An electric motor 204*b* is also configured to generate drive torque using electrical energy from a battery system 216. The drive torque generated by the electric motor 204*b* is provided directly to a second axle 208*b* of the vehicle 200. While not shown, it will be appreciated that an intermediary device, such as a transmission, could be implemented between the electric motor 204*b* and the second axle 208*b*. A control system or controller 220 controls operation of the vehicle 200. This includes, for example, controlling the engine 204*a* and the electric motor 204*b* such that a desired drive torque is collectively provided to the first and second axles 208*a*, 208*b*. This desired drive torque is based on one or more measured operating parameters from input device(s)/sensor(s) 224. Non-limiting examples of this input device(s)/sensor(s) 224 include an accelerator pedal, a brake pedal, and/or respective pedal sensors. It will be appreciated that the desired drive torque could also be based on other operating parameters, such as vehicle speed and engine speed. An SOC sensor 228 measures an SOC (e.g., a percentage of charge) of the battery system 216. The controller 220 also determines when a gear shift of the transmission 212 is to be performed.

Figure 3A:
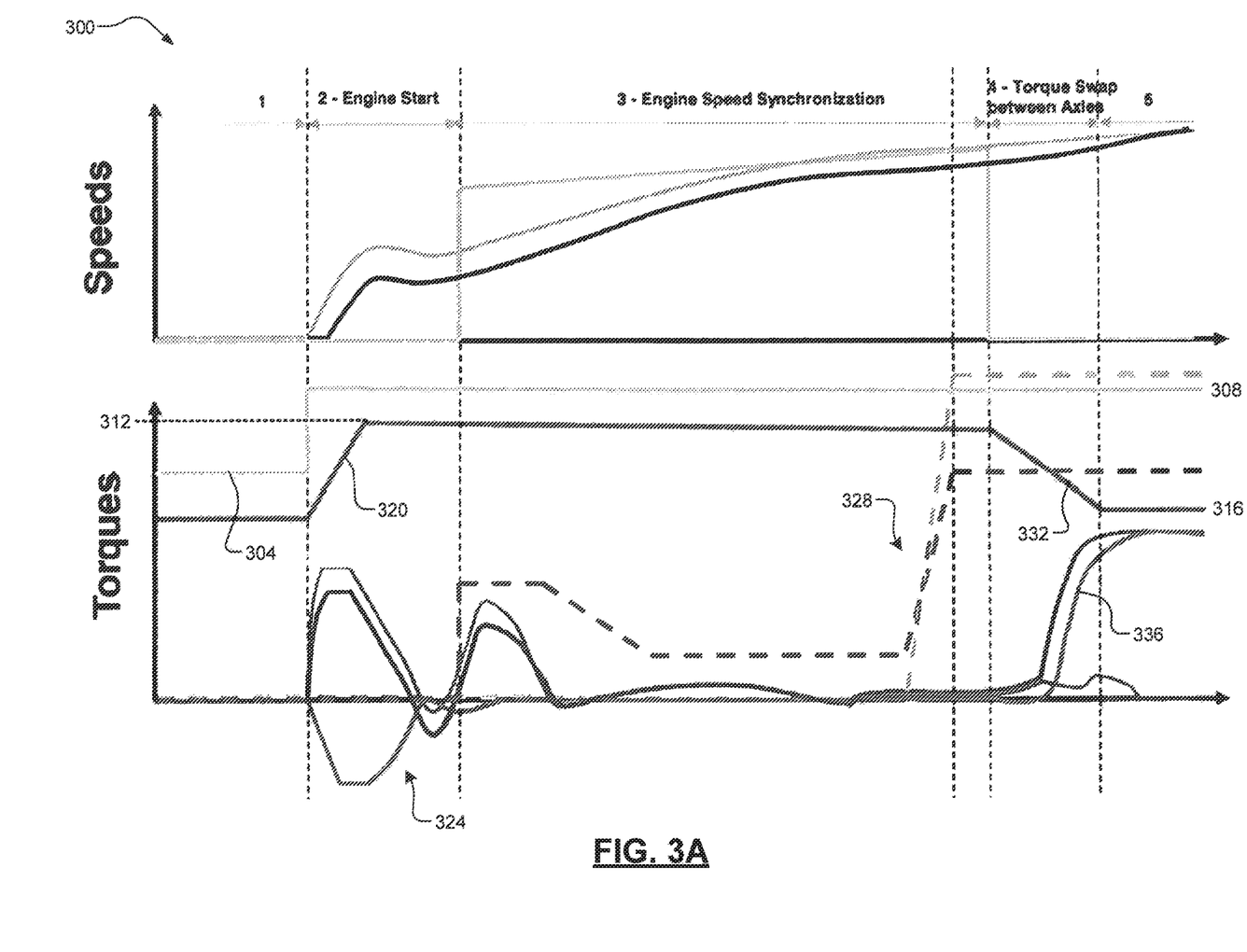
FIGS. 3A-3B illustrate example plots of torque and speed control during electric-only to parallel mode transitions in an eAWD hybrid vehicle according to the principles of the present disclosure.

Referring now to FIG. 3A, a plot 300 illustrates an example electric-only to parallel mode transition in response to a high driver torque demand. The mode transition is generally divided into four stages: (1) a driver torque request 304 that increases (e.g., in response to a pedal tip-in) to a level 308 above a maximum drive torque 312 that the electric motor 204*b* is capable of generating, (2) starting the engine (see engine torque 324) and increasing or ramping up the drive torque provided by the electric motor 204*b* by depleting a torque reserve (a difference between torque levels 312 and 316) to provide the expected acceleration feel for the driver, (3) engine/transmission speed synchronization, including building or increasing on-coming clutch pressure (see clutch pressure/capacity 328), (4) engaging the engine 204*a* to a gear of the transmission 212 and swapping torque between the axles 208*a*, 208*b* (i.e., increasing engine torque and decreasing electric motor torque as shown at 332 and 336). The collective amount of torque provided by the engine 204*a* and the electric motor 204*b* is capable of meeting the increased driver torque request 308.

Figure 3B:
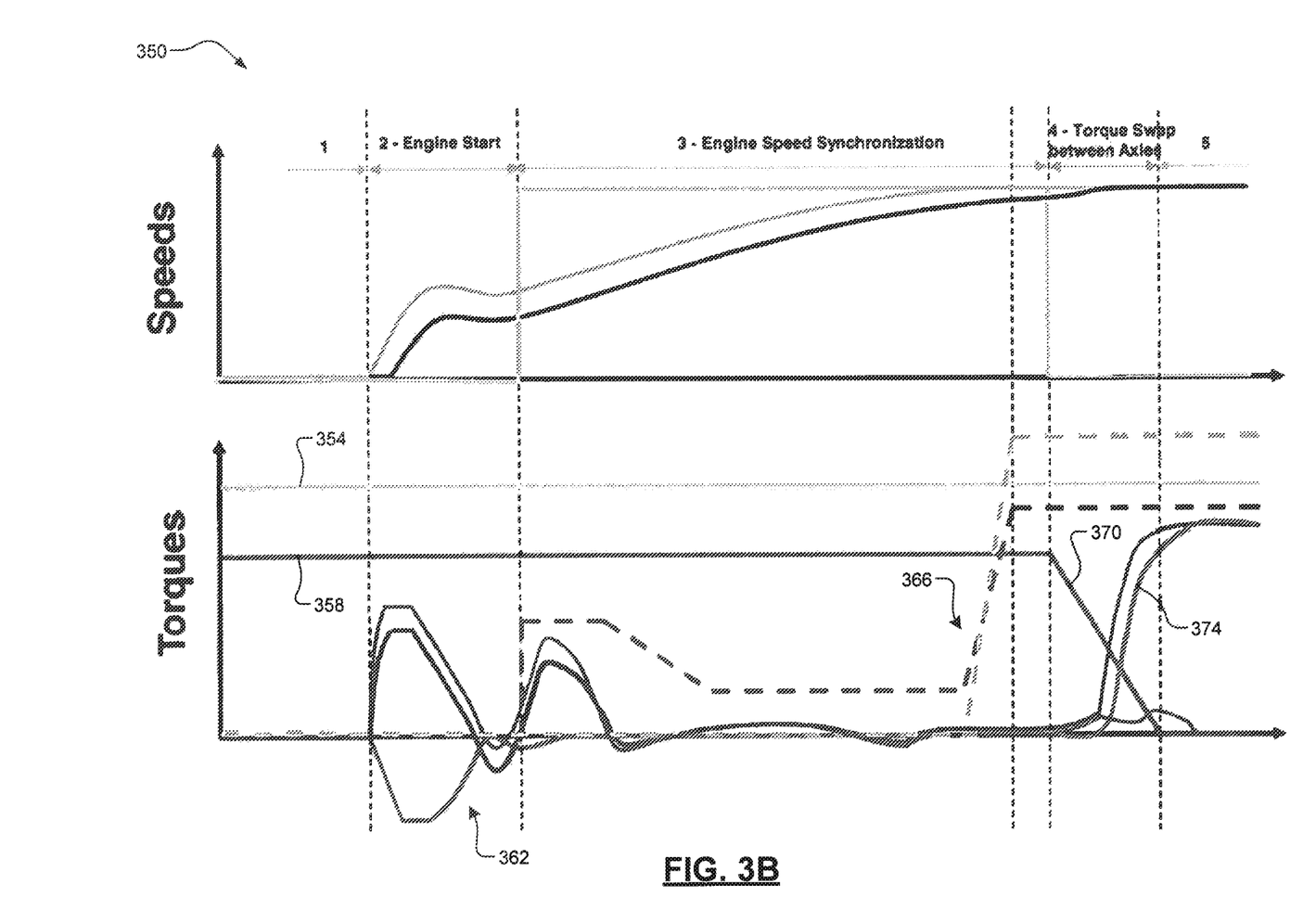

Referring now to FIG. 3B, another plot 350 illustrates another example electric-only to parallel mode transition in response to the battery system SOC falling below a threshold. The mode transition is again generally divided into four stages: (1) a driver torque request 304 that is constant but greater than the electric motor 204*b* is capable of meeting due to the SOC of the battery system 216 falling below a threshold, (2) starting the engine (see engine torque 362), (3) engine/transmission speed synchronization, including building or increasing on-coming clutch pressure (see clutch pressure/capacity 366), (4) engaging the engine 204*a* to a gear of the transmission 212 and swapping torque between the axles 208*a*, 208*b* (i.e., increasing engine torque and decreasing electric motor torque as shown at 332 and 336). The electric motor torque 370 could be decreased to zero to allow for recharging of the battery system 216 and the engine torque could be increased to meet the driver torque request. It will also be appreciated that these techniques could also be utilized in conjunction in some manner, i.e., both a high driver torque request and a relatively low SOC.

Figure 4A:
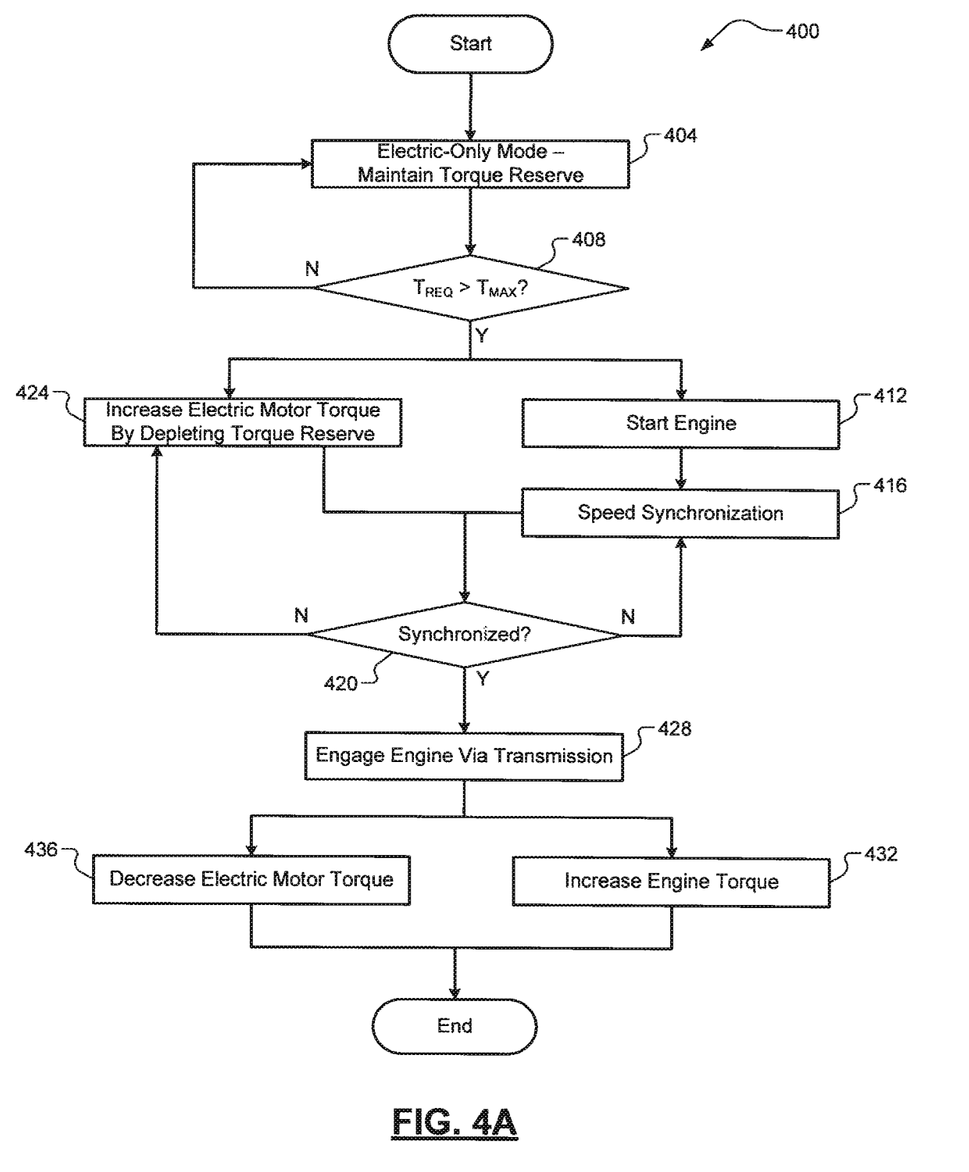
FIGS. 4A-4B illustrate example flow diagrams of methods of performing electric-only to parallel mode transitions in an eAWD hybrid vehicle according to the principles of the present disclosure.
Figure 4B:
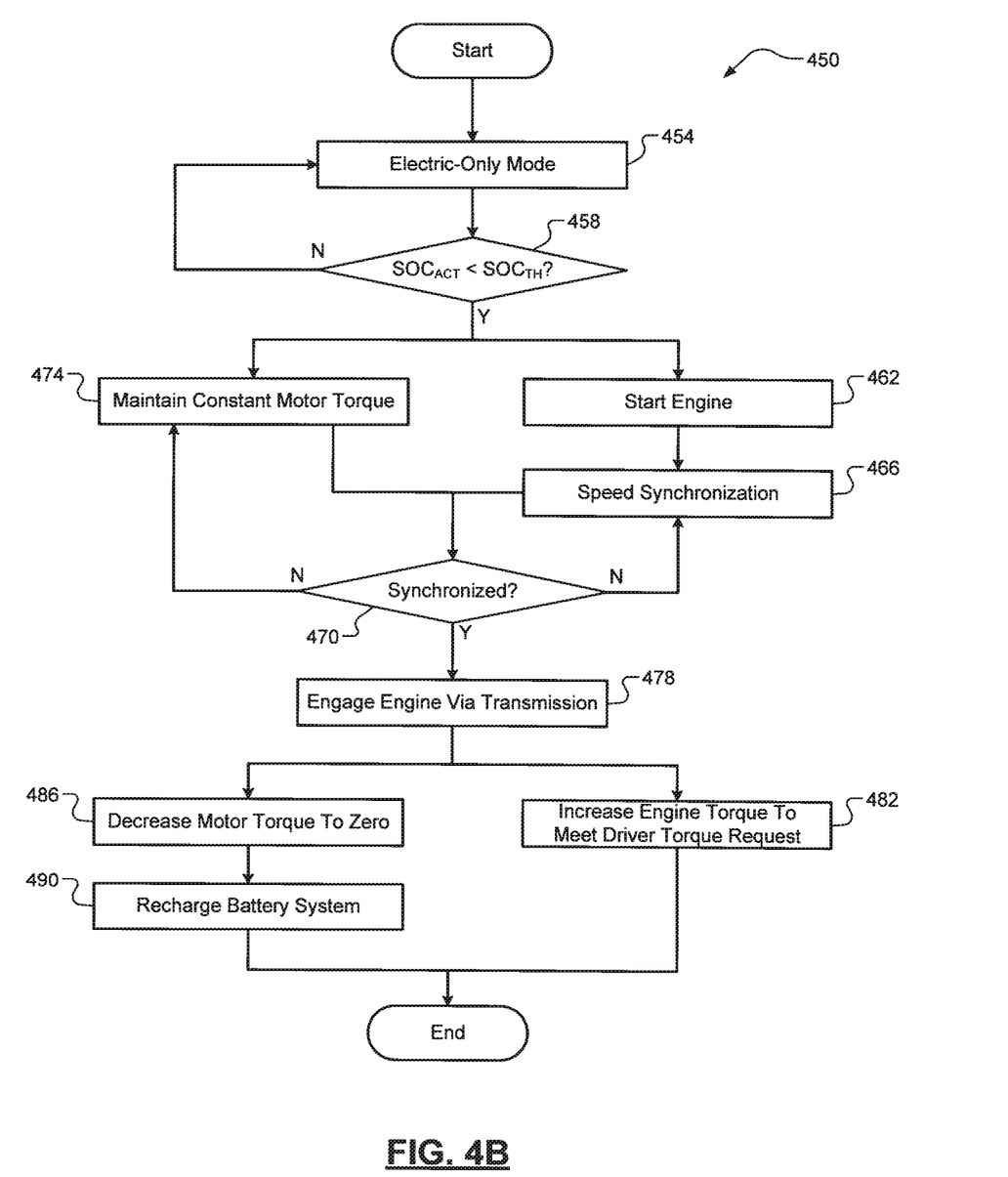

Referring now to FIG. 4A, an example flow diagram of a method 400 of performing an electric-only to parallel mode transition in response to high driver torque demand is illustrated. For illustrative purposes, the elements of FIG. 2 will be referred to hereafter, but it will be appreciated that this method 400, plots 300 and 350 discussed above and shown in FIGS. 3A-3B, and method 450 discussed below and shown in FIG. 4B, are also applicable to the vehicle 100 and its elements in FIG. 1. At 404, the controller 220 operates the vehicle 200 in the electric-only mode while also maintaining a torque reserve for the electric motor 204*b*. At 408, the controller 220 determines whether the driver torque request ($T_{REQ}$) exceeds the maximum drive torque ($T_{MAX}$) that the electric motor 204*b* is capable of generating. When false, the method 400 returns to 404 and the vehicle 200 continues operating in the electric-only mode. When true, the method 400 proceeds to parallel paths where the electric-only to parallel mode transition begins.

At 412, the controller 220 starts the engine 204*a* (e.g., using a BSG unit). At 416, the controller 220 performs the engine/transmission speed synchronization. When synchronization has been achieved at 420, the method 400 then proceeds to 428. Otherwise, synchronization continues until achieved. In parallel 424, the controller 220 commands the electric motor 204*b* to increase the drive torque it is providing to the second axle 208*b* by depleting its torque reserve. At 428, the controller 220 commands the engine 204*a* and the transmission 212 to engage. At parallel 432 and 436, the controller 220 commands engine torque to increase and electric motor torque to decrease such that the driver torque request is achieved by the collective drive torque provided by both devices 204*a*, 204*b*. For example, the electric motor torque could be decreased back to a continuous level where it was previously operating while maintaining the torque reserve. It will be appreciated, however, that the torque split between the devices 204*a*, 204*b* and axles 208*a*, 208*b* could be distributed in any suitable manner, such as decreasing the electric motor torque to an optimal level for system efficiency. The method 400 then ends.

Referring now to FIG. 4B, another example flow diagram of another method 450 of performing an electric-only to parallel mode transition in response to battery system SOC falling below a threshold is illustrated. At 454, the controller 220 operates the vehicle 200 in the electric-only mode. At 458, the controller 220 determines whether the actual SOC ($SOC_{ACT}$) of the battery system 216 (e.g., measured by sensor 228) has fallen below a threshold ($SOC_{TH}$). This threshold could be a critical threshold for avoiding potential damage to the battery system 216 or could correlate to an insufficient amount of charge for the electric motor 204b to achieve the driver torque request. When false, the method 400 returns to 454 and the vehicle 200 continues operating in the electric-only mode. When true, the method 450 splits into parallel paths where the electric-only to parallel transition begins.

At 462, the controller 220 starts the engine 204a (e.g., using a BSG unit). At 466, the controller 220 performs the engine/transmission speed synchronization. When synchronization has been achieved at 470, the method 450 then proceeds to 478. Otherwise, synchronization continues until achieved. In parallel 474, the controller 220 commands the electric motor 204b to continue providing a constant amount of drive torque (e.g., a maximum amount possible at the current battery system SOC level). At 478, the controller 220 commands the engine 204a and the transmission 212 to engage. At parallel 482 and 486-490, the controller 220 commands engine torque to increase to meet the driver torque request and electric motor torque to decrease to zero at 486 such that the battery system 216 is able to be recharged at 490. This recharging could involve, for example, the electric motor 204b acting as a generator via the energy at the second axle 208b. The method 450 then ends.

As previously mentioned herein, it will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an electrically all-wheel drive (eAWD) hybrid vehicle, the system comprising:
    an input device configured to receive a driver torque request; and
    a controller configured to:
        operate the hybrid vehicle in an electric-only mode including maintaining a torque reserve for an electric motor of the vehicle, wherein during the electric-only mode only the electric motor is providing drive torque to a first axle of the hybrid vehicle;
        receive, from the input device, the driver torque request;
        determine to transition the hybrid vehicle from the electric-only mode to a parallel mode based on the driver torque request or a state of charge (SOC) of a battery system that powers the electric motor, wherein during the parallel mode the electric motor is providing drive torque to the first axle and an engine of the vehicle is providing drive torque to a different second axle of the hybrid vehicle via a transmission; and
        when the driver torque request exceeds a maximum drive torque that the electric motor is capable of generating, increase the drive torque provided by the electric motor to the first axle by depleting the torque reserve while simultaneously synchronizing speeds of the engine and transmission during the electric-only to parallel mode transition.

2. The system of claim 1, wherein the controller is configured to increase the drive torque provided by the electric motor by depleting the torque reserve to provide an expected acceleration feel for a driver of the vehicle.

3. The system of claim 2, wherein upon the engine and transmission speeds being synchronized, the controller is further configured to complete the electric-only to parallel mode transition by:
    decreasing the drive torque provided by the electric motor to the first axle; and
    increasing the drive torque provided by the engine to the second axle via the transmission,
    wherein the drive torque provided by the electric motor and the engine via the transmission collectively meet the driver torque request.

4. The system of claim 3, wherein the controller is configured to decrease the drive torque provided by the electric motor to the first axle to an optimal level for system efficiency.

5. The system of claim 1, further comprising:
    an SOC sensor configured to measure the SOC of the battery system,
    wherein the controller is configured to perform the electric-only to parallel mode transition when the measured SOC of the battery system falls below an SOC threshold indicative of a need to recharge the battery system.

6. The system of claim 5, wherein upon the engine and transmission speeds being synchronized, the controller is further configured to complete the electric-only to parallel mode transition by:
    decreasing the drive torque provided by the electric motor to the first axle to zero such that the battery system can be recharged; and
    increasing the drive torque provided by the engine to the second axle via the transmission to meet the driver torque request.

7. The system of claim 1, wherein the engine further comprises a belt-driven starter generator (BSG) unit configured to start the engine.

8. The system of claim 1, wherein the first axle is a rear axle of the vehicle and the second axle is a front axle of the vehicle.

9. A method of performing a mode transition of an electrically all-wheel drive (eAWD) hybrid vehicle, the method comprising:
    operating, by a controller, the hybrid vehicle in an electric-only mode including maintaining a torque reserve for an electric motor of the vehicle, wherein during the electric-only mode only the electric motor is providing drive torque to a first axle of the hybrid vehicle;
    receiving, by the controller and from an input device, a driver torque request;
    determining, by the controller, to transition the hybrid vehicle from the electric-only mode to a parallel mode based on the driver torque request or a state of charge (SOC) of a battery system that powers the electric motor, wherein during the parallel mode the electric motor is providing drive torque to the first axle and an engine of the vehicle is providing drive torque to a different second axle of the hybrid vehicle via a transmission; and when the driver torque request exceeds a maximum drive torque that the electric motor is capable of generating, increasing, by the controller, the drive torque provided by the electric motor to the first axle by depleting the torque reserve while simultaneously synchronizing speeds of the engine and transmission during the electric-only to parallel mode transition.

10. The method of claim 9, wherein increasing the drive torque provided by the electric motor comprises depleting the torque reserve to provide an expected acceleration feel for a driver of the vehicle.

11. The method of claim 10, further comprising upon the engine and transmission speeds being synchronized, completing, by the controller, the electric-only to parallel mode transition by:

decreasing, by the controller, the drive torque provided by the electric motor to the first axle; and increasing, by the controller, the drive torque provided by the engine to the second axle via the transmission, wherein the drive torque provided by the electric motor and the engine via the transmission collectively meet the driver torque request.

12. The method of claim 11, wherein decreasing the drive torque provided by the electric motor to the first axle comprises decreasing, by the controller, the drive torque provided by the electric motor to the first axle to an optimal level for system efficiency.

13. The method of claim 9, further comprising:

receiving, by the controller and from an SOC sensor, a measured SOC of the battery system, wherein the electric-only to parallel mode transition is performed when the measured SOC of the battery system falls below an SOC threshold indicative of a need to recharge the battery system.

14. The method of claim 13, further comprising upon the engine and transmission speeds being synchronized, completing, by the controller, the electric-only to parallel mode transition by:

decreasing, by the controller, the drive torque provided by the electric motor to the first axle to zero such that the battery system can be recharged; and increasing, by the controller, the drive torque provided by the engine to the second axle via the transmission to meet the driver torque request.

15. The method of claim 9, wherein the engine further comprises a belt-driven starter generator (BSG) unit configured to start the engine.

16. The method of claim 9, wherein the first axle is a rear axle of the vehicle and the second axle is a front axle of the vehicle.

* * * * *